Dec. 25, 1951 W. D. HUSTON ET AL 2,579,496

SWITCH ARRANGEMENT ON PHONOGRAPH PICKUP

Original Filed Oct. 17, 1944

*INVENTORS*
JAMES M. BRADY
WILLIAM D. HUSTON
*BY* Harry M. Saragovitz
Attorney

Patented Dec. 25, 1951 2,579,496

UNITED STATES PATENT OFFICE 2,579,496

SWITCH ARRANGEMENT ON PHONOGRAPH PICKUP

William D. Huston, Cranford, N. J., and James M. Brady, Washington, D. C., assignors to the United States of America as represented by the Secretary of War Original application October 17, 1944, Serial No. 559,108. Divided and this application June 7, 1945, Serial No. 598,194

3 Claims. (Cl. 200—52)

(Granted under the act of March 3, 1883, as amended April 30, 1928; 370 O. G. 757)

The invention described herein may be manufactured and used by or for the Government for governmental purposes, without the payment to us of any royalty thereon.

This application is a division of our co-pending application on Telemetering System, filed October 17, 1944, and given Serial No. 559,108, now Patent No. 2,547,009.

This invention relates to telemetering systems and more particularly to the telemetering systems which use a disc for transmitting the necessary message.

A reproducing arm mounted in reproducing relationship with respect to a signal transmitting portion of the disc may be connected to any instrument which is capable of changing the angular position of the arm with respect to the disc. Although the invention is not limited to any particular type of measurements, it will be illustrated in connection with the transmission of meteorological data in which case the reproducing arms are connected to the meteorological instruments such as humidity, temperature, pressure, wind velocity-and-direction instruments.

The invention may be considered as an improvement on a telemetering system disclosed in the U. S. application for patent, Serial No. 492,334, now Patent No. 2,526,631, of James M. Brady, filed June 25, 1943, and tilted "Telemetering Systems," which discloses a system for transmitting meteorological data with the aid of a phonograph disc, and a plurality of reproducing arms connected to the meteorological instruments. Since one disc is used for actuating all of the reproducing arms, commutating means are used for connecting one reproducing arm at a time to the transmitter for keying it. The readings of the instruments are thus transformed into code signals recorded in the concentric grooves of the disc.

Since the arms cannot be actuated or shifted angularly by the instruments as long as the reproducing needles of the arms rest within any particular groove, it becomes necessary to disengage the arms periodically from the disc in order to allow the arms to assume the angular position corresponding to the physical state of the instruments. The previously identified application provides mechanical cams which lift and lower the record periodically thus engaging and disengaging the reproducing arms with the disc, all arms engaging the disc simultaneously when the cam raises the disc. The disc-raising mechanism requires a number of mechanical elements which complicate the structure and increase its weight. Accordingly, because of the relatively complicated nature of the mechanical elements and their aggregate weight the system disclosed in the prior application is not suitable for radiosonde use.

The present invention solves many mechanical difficulties inherent to the previously disclosed system by elevating a portion of the disc used for transmitting the code message, and by depressing the remaining portion of the disc so that the recording arms come into contact with the disc only when the raised sector of the disc comes into contact with the reproducing element of the arm. The height of the raised sector is made so that the arms are free to change their angular position with respect to the disc as long as they are over the depressed portion of the disc, and become fixed only for a limited length of time upon engaging the raised sector, the time being determined by the angle spanned by the raised sector and the angular velocity of the disc. As in the previously identified application of Brady, a code, such as Morse, Baudot or audio frequency code, is used for identifying any particular groove on the raised sector. Ordinarily the grooves are concentrically disposed with respect to the center of the record so that the grooves themselves do not change the angular position of the reproducing arms with respect to the disc.

The advantages of the telemetering system using a record provided with the raised sector are two fold: first, the mechanical elements necessary for engaging and disengaging the reproducing arms with the disc become unnecessary, and second, the same is true of the commutating system which is otherwise necessary for connecting only one arm at a time to the transmitter. It is obvious that the raised sector of the disc solves these two limitations present in the known systems in a simple and positive manner making it possible to use a system of this type for transmitting the meteorological data from the radiosonde thus increasing the applicability of the systems using the phonograph record.

It is therefore the principal object of this invention to provide a telemetering system which uses a phonograph record with a raised sector for transmitting the intelligence.

It is an additional object of this invention to provide reproducing arms simple in structure and light in weight which could be suitably used in connection with the phonograph record provided with a raised sector, the grooves on the raised sector bearing the recorded code for identifying the grooves and the angular position of the reproducing arms with respect to the phonograph record.

The novel features which we believe to be characteristic of our invention are set forth with particularity in the appended claims. Our invention itself, however, both as to its organization and method of operation, together with further objects and advantages thereof, may best be understood by references to the following description taken in connection with the accompanying drawings in which:

Figure 1:
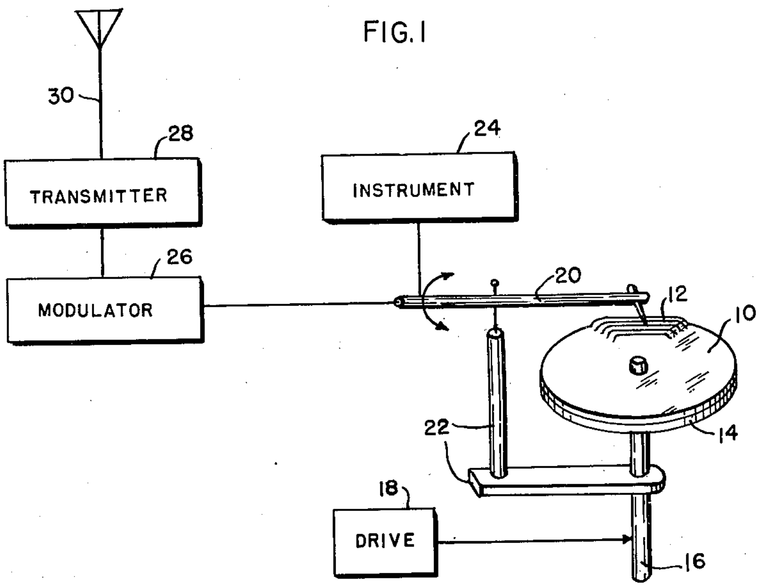
Figure 1 is a block diagram of the telemetering system.

Referring now to Fig. 1, a phonograph disc 10 with a raised sector 12 is mounted on a turn table 14 connected to a shaft 16. Shaft 16 is connected to a drive 18 which may be an electric motor in the case of ground systems and a gravity motor or a windmill in the case of a radiosonde. A reproducing arm 20 is mounted on brackets 22, the level of the arm being adjusted so that it is in reproducing engagement with sector 12, but is freely suspended from its pivot when the disc turns and puts the depressed portion 10 of the disc under the arm. During this period the arm is free to change its angular position and to follow the readings of an instrument 24 to which it is connected by appropriate levers. The possible directions of travel of the arm are illustrated by a double arrow in the drawing. The arm is connected to a modulator 26 which follows the code signals impressed upon it by the arm when the latter engages the raised sector. The modulator keys a transmitter 28, and the latter transmits the code over an antenna 30. Only one reproducing arm 20 is illustrated in Fig. 1 for the sake of simplicity of the drawing, although in practice a plurality of similar arms radially disposed about the disc are used.

Figure 2:
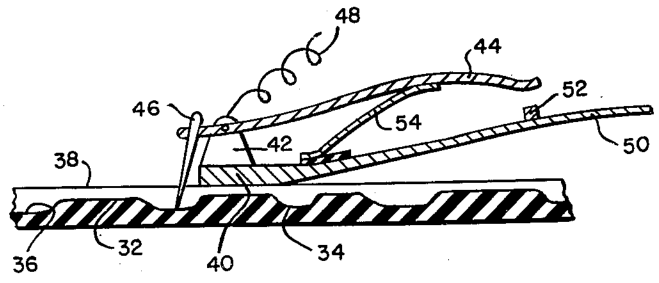
Figure 2 illustrates a type of reproducing arm especially suitable for the application outlined in this specification.

Fig. 2 shows a type of reproducing arm which may be used in connection with the phonograph disc illustrated in Fig. 1. Generally speaking, it is obvious that an arm suitable for radiosonde use must be very light, mechanically simple, and inexpensive to manufacture since as many as four or five arms may be used in connection with one radiosonde which may be lost after only one use.

Fig. 2 illustrates the arm which may be used in connection with either lateral or hill-and-dale record provided with Morse or Baudot code signals, the figure illustrating this record as hills 32 and dales 34 embedded in a groove 36, 36 designating the bottom and 38 the top of the groove. As shown in the figure, the arm is provided with a block 40 which slides over the top portion of the record, the block also acting as a support for a bracket 42 used for pivoting a lever arm 44. Lever arm 44 comprises a light, metallic spring equipped with a needle 46, bracket 42 insulating the lever arm from conductor 50. The lever arm forms a lever of the first kind which opens and closes the circuit connected to conductor 48, contact 52, and conductive arm 50. The lever arm is held in engagement with the record by means of a spring 54. The hill-and-dale portions 32, 34 of the record swing the lever arm 44 and close and open contact 52, thus, keying the modulator 26, Fig. 1.

The reproducing arm 50, which represents the pivoted arm connected to the meteorological instrument, is made of metal and acts as a spring for holding block 40 in engagement with the disc so that the needle does not lift the entire reproducer and arm 50 when it strikes hill 32 but acts only against the tension of spring 54 which is much weaker than the pressure exerted on block 40 by spring 50. Therefore, arm 44 positively engages contact 52 upon the actuation of needle 46 by hill 32. The lever advantage used in connection with the lever arm 44 is such that arm 44 strikes contact 52 before needle 46 reaches the flat portion of hill 32 and further upper travel of the needle results in bending of the right part of arm 44, which acts as a relatively weak flat spring. This type of arrangement facilitates obtaining positive electrical contact between arm 44 and contact 52.

No specific electrical circuits are disclosed in this specification which may be used in connection with the illustrated reproducing arm since enumeration of all possible combinations would unnecessarily burden this disclosure. Double modulation used with the radiosonde transmitters of today is also possible in connection with the disclosed arm, making and breaking of the electrical contacts by the arm, changing the time constant of the R—C combination in the grid circuit of the blocking oscillator interposed between the arm and the transmitting oscillator. For a more detailed description of suitable modulator-transmitter circuits of this type reference is made to application of Leo S. Craig, et al, S. N. 552,854, filed September 6, 1944, now Patent No. 2,509,215. In order to obtain the desired audio frequency changes in the blocking oscillator with the reproducing arms illustrated in the drawings, a fixed resistance may be connected in series with the closing and opening contacts of the reproducing element.

It is believed that the construction and operation of the telemetering system disclosed in this specification, as well as the many advantages thereof, will be apparent from the foregoing description. It should be understood, therefore, that while we have shown and described our invention in a preferred form, reasonable changes and modifications may be made by those skilled in the art without departing from the spirit of the invention as sought to be defined in the following claims.

We claim:

1. A phonograph reproducing arm for use with a phonograph record having grooves cut in the face thereof, wherein the surface of said grooves varies along the length of said grooves in accordance with recorded signals, said reproducing arm comprising a pivoted spring slidably engaging with and riding on said face of said phonograph record, a lever pivoted on the engaging end of said pivoted spring, and having, at the outer end of said lever projecting beyond the engaging portion of said pivoted spring, a pointed sensing member disposed within a groove for varying the position of said lever relative to said pivoted spring in accordance with recorded signals, and a pair of engageable contacts, one of which is on said pivoted spring and the other of which is on the opposite end of said lever, whereby said lever closes and opens said contacts in accordance with said recorded signals.

2. A phonograph reproducing arm, as defined in claim 1, in which said arm further includes a second spring mounted on said pivoted spring for pressing said lever and needle into positive engagement with said groove.

3. A phonograph reproducing arm for use with a phonograph record having grooves cut in the face thereof, wherein the depth of said grooves varies along the length of said grooves in accordance with recorded signals, said reproducing arm comprising a pivoted spring slidably engaging with and riding on said face of said phonograph record, a lever pivoted on the engaging end of said pivoted spring, and having, at the outer end of said lever projecting beyond the engaging portion of said pivoted spring, a pointed sensing member disposed within a groove, said lever having a degree of freedom about its pivot point which enables said member to rotate said lever relative to said pivoted spring in accordance with the depth of said grooves, and a pair of engageable contacts, one of which is on said pivoted spring and the other of which is on the opposite end of said lever, whereby said lever closes and opens said contacts in accordance with said recorded signals.

WILLIAM D. HUSTON.
JAMES M. BRADY.

REFERENCES CITED

The following references are of record in the file of this patent:

UNITED STATES PATENTS

| Number | Name | Date |
|---|---|---|
| 1,120,712 | Hall | Dec. 15, 1914 |
| 1,960,020 | McGall | May 22, 1934 |
| 2,066,538 | Phelps | Jan. 5, 1937 |